United States Patent
Clemons

[15] 3,707,164
[45] Dec. 26, 1972

[54] LINE MOVE
[72] Inventor: Victor G. Clemons, 10716 Cruser Drive, Boise, Idaho 83705
[22] Filed: June 24, 1970
[21] Appl. No.: 49,464

[52] U.S. Cl. ................................................137/344
[51] Int. Cl. ............................B05b 9/02, E01h 3/02
[58] Field of Search......239/179, 180, 181, 190, 212, 239/213, 241, 242, 243; 137/344

[56] References Cited

UNITED STATES PATENTS

| 3,493,176 | 2/1970 | Kinkead | 137/344 X |
| 3,545,478 | 12/1970 | Etgen | 137/344 |
| 3,009,645 | 11/1961 | Nugent | 239/213 X |
| 2,628,863 | 2/1953 | Maggart | 239/212 X |
| 1,321,350 | 11/1919 | Alvarez | 239/212 X |
| 2,744,785 | 5/1956 | Lundegreen | 239/212 X |
| 2,807,500 | 9/1957 | Clayton | 239/212 X |
| 2,931,579 | 4/1960 | Ruddell | 239/212 X |
| 3,385,315 | 5/1968 | Decoto | 239/212 X |
| 3,386,661 | 6/1968 | Olson et al. | 239/212 X |
| 3,444,941 | 5/1969 | Purtell | 239/212 X |
| 3,498,314 | 3/1970 | Gheen | 239/212 X |
| 3,538,941 | 11/1970 | Bates | 239/212 |

Primary Examiner—Samuel Scott
Attorney—Buckhorn, Blore, Klarquist & Sparkman

[57] ABSTRACT

In one embodiment, individually powered tractors carrying a pipe are individually stopped to cause the other still traveling tractors to swing the line toward a baseline in case of excess tension on the pipe or to swing the line away from the baseline in case of excess compression on the pipe, thereby eliminating drift of the line. In another embodiment, a first tractor is guided along a baseline ditch and wheels of other tractors helping to carry a pipe are turned somewhat toward the baseline in case of tension and are turned outwardly from the baseline in case of compression, the line being swingable about the first tractor at each end of the baseline so as to travel along one side of a field, around an end portion of the field back along the other side of the field and around the other end portion of the field. Tension and compression of the pipe may be detected by feeler structure movable along a ditch forming the baseline or by feelers on loose ball-and-socket joints, mechanically connecting sections of the pipe together.

20 Claims, 12 Drawing Figures

FIG. I

VICTOR G. CLEMONS
INVENTOR

BY
BUCKHORN, BLORE, KLARQUIST & SPARKMAN
ATTORNEYS

PATENTED DEC 26 1972 3,707,164

VICTOR G. CLEMONS
INVENTOR

BY
BUCKHORN, BLORE, KLARQUIST & SPARKMAN
ATTORNEYS

PATENTED DEC 26 1972

VICTOR G. CLEMONS
*INVENTOR*

BY
BUCKHORN, BLORE, KLARQUIST & SPARKMAN
*ATTORNEYS*

VICTOR G. CLEMONS
INVENTOR

BY
BUCKHORN, BLORE, KLARQUIST & SPARKMAN
ATTORNEYS 3,707,164

LINE MOVE

DESCRIPTION

This invention relates to improved line moves, and more particularly to line moves free of endwise drift.

An object of the invention is to provide new and improved line moves. Another object of the invention is to provide line moves free of endwise drift.

A further object of the invention is to provide line moves in each of which a pipe is carried by tractors spaced therealong, which tractors are controlled by a drift detector to correct tendency for the line to drift endwise relative to a baseline.

Another object of the invention is to provide a line move in which an end tractor of a series of individually powered tractors carrying a pipe travels along a water supply ditch, the end tractor being stopped or slowed relative to other tractors if the pipe is tensioned, and the other tractors being stopped or slowed relative to that end tractor if the pipe is compressed, whereby the line swings somewhat toward the ditch to relieve tension and swings somewhat away from the ditch to relieve compression.

Another object of the invention is to provide a line move in which one end tractor of a series of individually powered tractors supporting a pipe travels along a baseline and, to prevent endwise drift of the line move, the other tractors are provided with wheels which are turned by detectors somewhat toward the ditch when the pipe is tensioned and are turned somewhat away from the ditch when the pipe is under compression.

A further object of the invention is to provide a line move in which pipe supporting tractors are driven by hydraulic motors supplied by a pump or pumps either on the same tractors as the motors or on a tractor or tractors remote from the tractors carrying the motors.

Another object of the invention is to provide a line move having a tractor supported by two wheels which are driven by two motors in line with the wheels and with the wheels and motors turnable on the frame.

Another object of the invention is to provide a line move of a given length which sequentially moves along one side of a field to irrigate that side of the field, then swings 180° around the inner end of the line move to irrigate one end portion of the field then travels back along the other side of the field to irrigate that side of the field, and then swings 180° around the inner end of the line move to irrigate the other end portion of the field.

Another object of the invention is to provide a line move in which a plurality of pipe sections joined by flexible couplings and connected mechanically together by loose, external ball-and-socket couplings which actuate detectors both when the pipe sections are under compression and when the pipe sections are under tension.

The foregoing and other objections, features and advantages of the invention will become more apparent from the following detailed description which proceeds with reference to the accompanying drawings wherein.

Figure 1:
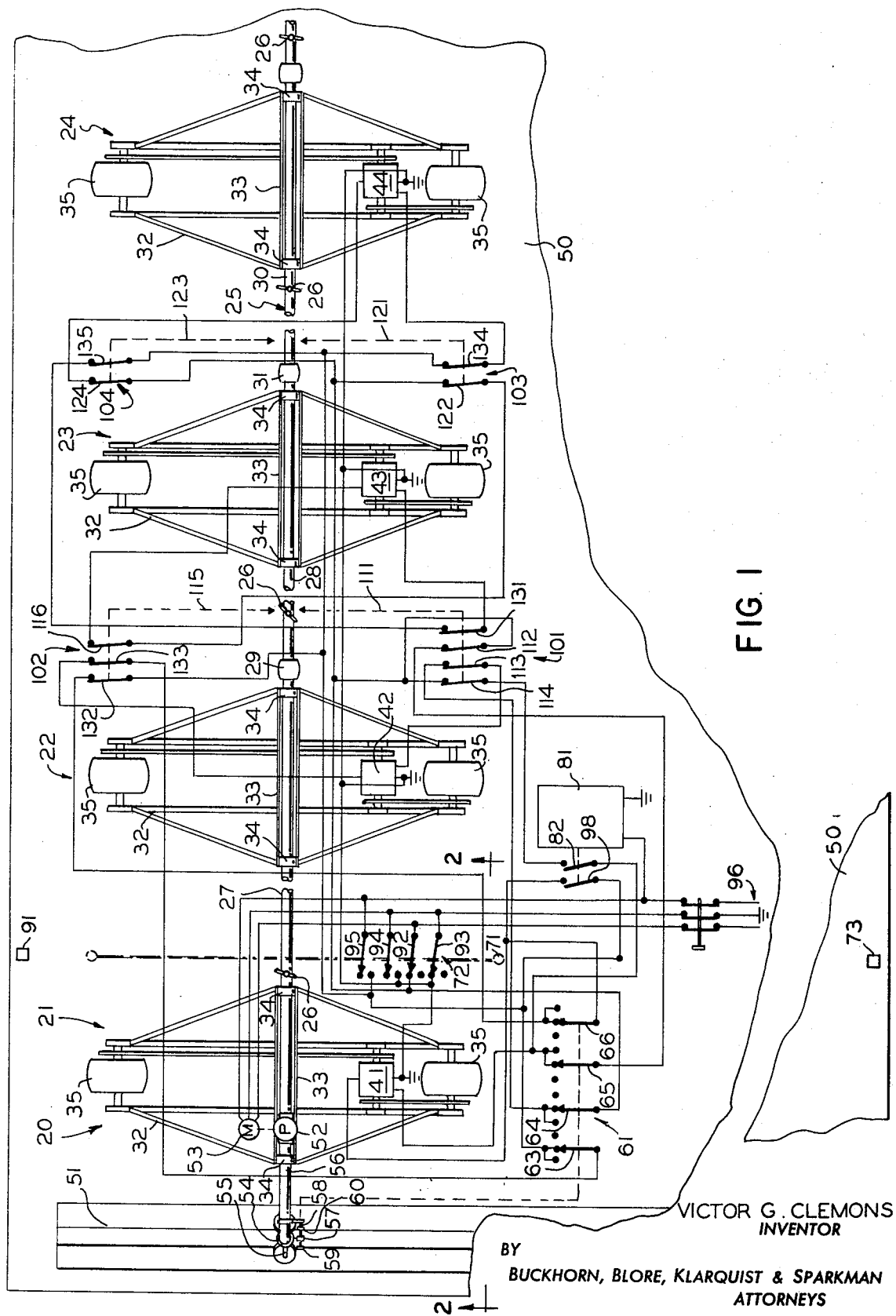
FIG. 1 is a partially schematic, top plan view of a line move forming one embodiment of the invention and a field irrigated thereby.
Figure 2:
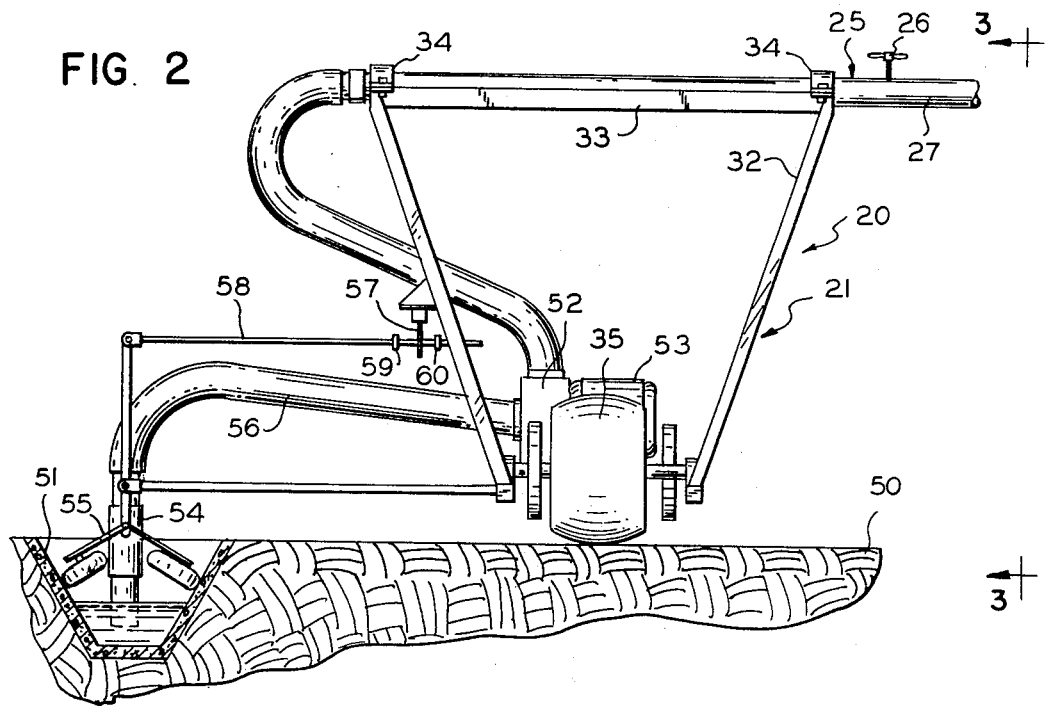
FIG. 2 is an enlarged, vertical sectional view taken along line 2—2 of FIG. 1.
Figure 3:
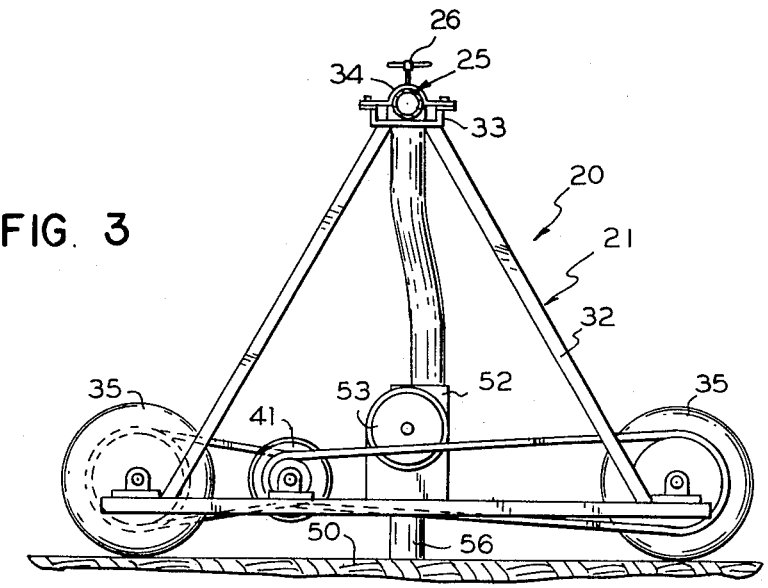
FIG. 3 is an enlarged, vertical sectional view taken along line 3—3 of FIG. 2.

Referring now in detail to the drawings, there is shown in FIGS. 1 to 3 a line move 20 forming one embodiment of the invention and including individually driven tractors or carriages 21, 22, 23 and 24 carrying a pipe 25 in an elevated position. The pipe has sprinklers 26 spaced therealong and includes a first pipe section 27 carried by and rigidly clamped to the carriages 21 and 22, a second pipe section 28 coupled by a universal coupling 29 to the section 27 and carried by and rigidly clamped to the carriage 23, and a third pipe section 30 coupled by a universal coupling 31 to the pipe section 28 and carried by and rigidly clamped to the carriage 24. It will be understood that each of the pipe sections 27, 28 and 30 is partly supported by a separate truss (not shown) as is well known in the art, which makes each section somewhat rigid, each pipe section being shown much shorter than it actually would be. The tractors have rigid frames 32 clamped to and supporting the pipe sections by means of troughs 33 and clamping bands 34, a pair of wheels 35 supports each frame, and electric motor drives 41, 42, 43 and 44 drive the wheels of the tractor 21, 22, 23 and 24, respectively.

The tractors 21 to 24 are movable along a field 50 to be irrigated either forwardly (upwardly as viewed in FIG. 1) or rearwardly (downwardly as viewed in FIG. 1) and parallel to a baseline, which, as shown, is a water supplying ditch 51 at one edge of the field, and a pump 52 driven continuously by a pump motor 53 pumps water from a strainer 54 in the ditch to the pipe 25 and the sprinklers 26. The strainer is carried by a wheel carriage 55 movable along the ditch in a position always centered in the ditch and the strainer is connected by a flexible section 56 to the inlet of the pump 52 which is fixed on the frame 32 of the carriage. A forked switch actuator arm 57 of a limit switch 61 is carried by the frame 32 slidable on an actuator rod 58 between stops 59 and 60 adjustably fixed in spaced positions to the rod 58, the rod being slidably carried by the carriage 55. If the carriage 21 starts to drift too far to the left, as viewed in FIG. 2 relative to the ditch 51, the arm 57 is engaged by stop 60 and actuates the limit switch 61 to open contacts 63 and 64 (FIG. 1), and if the carriage 21 starts to drift too far to the right relative to the ditch, the arm 57 (FIG. 2) is engaged by the stop 59 and contacts 65 and 66 of the switch 61 are opened thereby.

Assuming actuator 71 of direction control switch 72 on the tractor 21 to have been pressed upwardly, as viewed in FIG. 1, by post 73 at the lower end of the field 50 to set the switch 72 in its forward position as shown in FIG. 1, when the tractor 21 tends to move too far to the right so that the contacts 65 are opened, the opening of the contacts 65 cuts power to the motor 41 of the tractor 21. The tractor 22 continues to drive forwardly to swing the pipe section 27 and the tractor 21 to positions directed somewhat toward the ditch. A continuously driven timer 81 closes contacts 82 periodically for short periods, the contacts 82 being closed for a suitable fraction of, for example, 3 seconds of each 15 seconds, and the contacts 82 parallel the drift contacts 65 and drive the motor 41 periodically, even though the contacts 65 are open. This inches the tractor 21 back to the left until the contacts 65 reclose. Then the tractor 21 is again driven continuously.

Assuming the move to be driving in the forward direction and that the tractor 21 has drifted slightly too far to the left, as viewed in FIG. 1, from the desired position, the actuator switch arm 57 will be engaged by the stop 60 and have caused contacts 64 of the drift limit switch 61 to have opened. This cuts power to the motor 42 to stop the tractor 22. The tractor 21 continues to run and, in effect, swings around the tractor 22 and drives in a direction angled somewhat to the right of the ditch 51 until the tractor moves far enough to the right of the ditch 51 that the contacts 64 reclose. Then the motor 42 is again energized and both the tractors 21 and 22 are driven forwardly.

When the line move 20 reaches the upper end of the field 50, as viewed in FIG. 1, the actuator 71 of the direction switch 72 engages post 91 and the condition of the switch 72 is reversed to open forward contacts 92 and 93 and to close reverse contacts 94 and 95. This reverses the direction of the line move so that it moves down the field until the actuator 71 engages the reversing post 73 at the other end of the field. The motors 41 and 42 are then driven in the opposite direction by power supplied thereto through contacts 66 and 63, respectively, of the drift control switch 61 from a three phase power line 96. As line moves in reverse, if there is drift to the right relative to the ditch, the contacts 66 open to stop the motor 41 and the tractor 22 continues to move to swing the pipe section 27 and the tractor 21 somewhat toward the ditch. This, plus periodic closing of contacts 98 by the timer 81, inches the tractor 21 back to the left until the contacts 66 reclose to then drive the tractor 21 continuously. If the line drifts to the left relative to the centerline of the desired travel of the tractor 21, the collar 57 actuates the drift control switch 61 to open the contacts 63 to stop the motor drive 42 until the tractor 21 swings around the stopped tractor 22 sufficiently to reclose the contacts 63.

For alignment control of the tractors 23 and 24 relative to the tractor 22, there are provided limit switches 101 and 102 carried by the carriage 22, and limit switches 103 and 104 carried by the carriage 23. Assuming forward travel of the line move, if the carriage 23 lags too far behind the carriages 21 and 22, the pipe section 28 contacts and moves switch actuator 111 of the switch 101 to open contacts 112 and 113 of the switch 101 to stop the motor drives 41 and 42 until the tractor 23 corrects the lagging condition, the limit switches being of the toggle type so that there is some lag in their actuation. If the tractor 23 should lead the tractors 21 and 22 too far, the pipe section pivots forwardly about the coupling 29 and engages and actuates actuator 115 of the limit switch 102 to open contacts 116 to stop motor drive 43 until the tractors 21 and 22 drive sufficiently far forwardly to remove the leading condition of the tractor 23. If the tractor 24 lags too much, pipe section 30 swings back about coupling 31 to actuate actuator 121 to open contacts 122 of the switch 103 to stop motor drive 43 until the tractor 24 removes its lagging condition. If the tractor 24 should lead too much, the pipe section 30 actuates actuator 123 to open contacts 124 of the switch 104 to stop the motor drive 44 until this condition is removed.

For alignment in the reverse direction, if the tractor 23 leads to tractors 21 and 22 too far, the pipe section 28 actuates the switch 101 to open contacts 131 to stop the motor drive 43 until this lead is removed. If the tractor 23 should lag the tractors 21 and 22 too far, the pipe section 28 actuates the switch 102 to open contacts 132 and 133 to stop the tractors 21 and 22 until their lead is removed. Similarly, excessive lead of the tractor 24 opens contacts 134 of the switch 103 to stop the tractor 24 until the lead is removed, and excessive lag of the tractor 24 actuates the switch 104 to open contacts 135 to stop the tractor 23 until this condition is corrected.

EMBODIMENT OF FIGS. 4 AND 5

Figure 4:
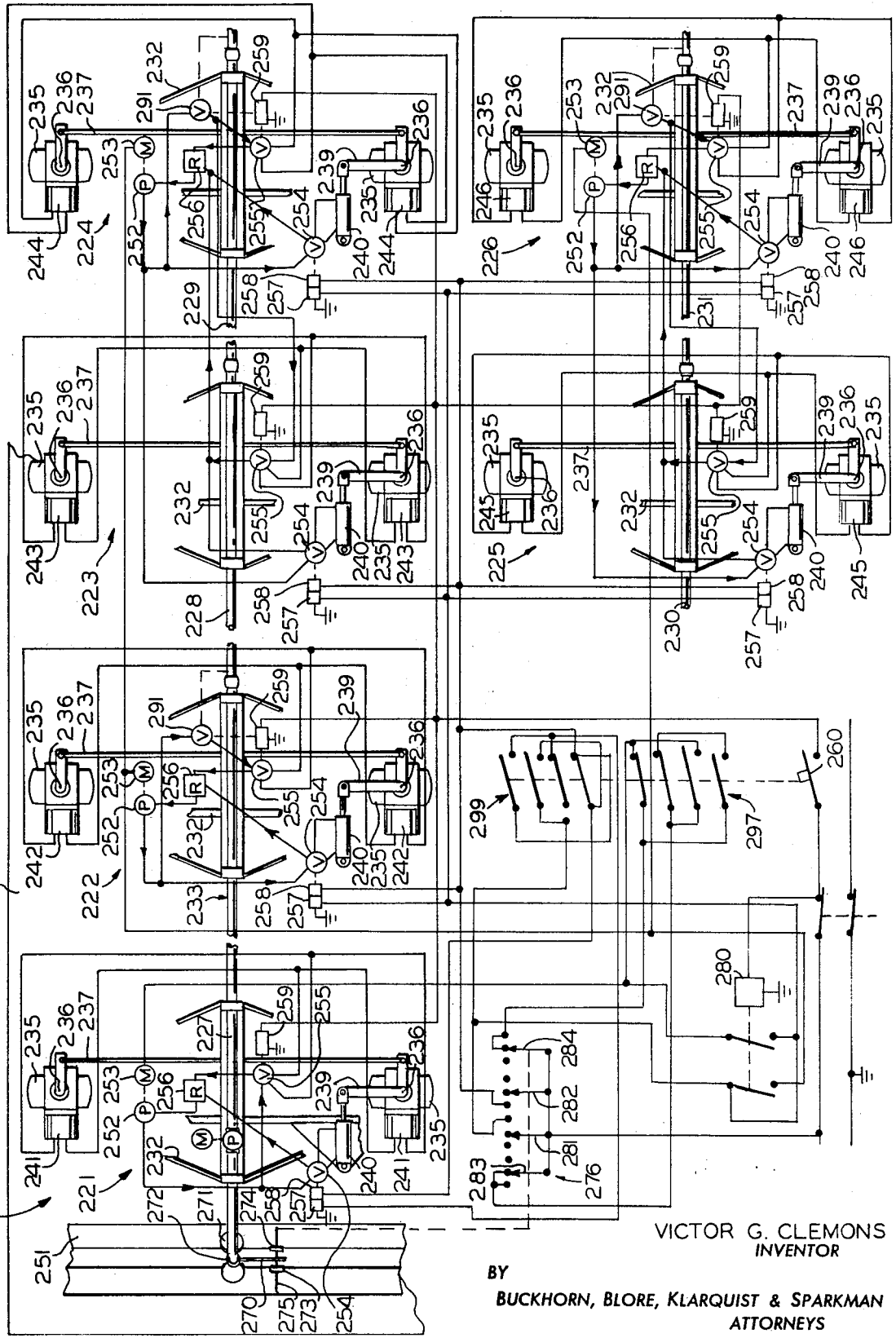
FIG. 4 is a partially schematic, top plan view of a line move forming an alternate embodiment of the invention and a field irrigated thereby.

A line move 220 forming an alternate embodiment of the invention is selectively movable forwardly (upwardly as viewed in FIG. 4) or rearwardly along a water supplying ditch 251 serving as a baseline device at one side of field 250 and includes tractors 221, 222, 223, 224, 225 and 226 having pairs of wheels 235 supporting frames 232, which support a pipe 233 having sections 227, 228, 229, 230 and 231 in a similar manner to that in which the tractors 21, 22, 23 and 24 support the sections 27, 28 and 30. The pairs of wheels 235 are driven individually by pairs of hydraulic motors 241, 242, 243, 244, 245 and 246 and each wheel is mounted pivotally on the frame 232 about a vertical pivot axis 236. The wheels of each pair are connected by a link 237 so that both wheels of each pair are kept parallel, and one wheel of each pair is adjusted about the pivot axis 236 by a lever 239 driven by a self-centering two-way cylinder 240.

Each tractor 221, 222, 224 and 226 carries a hydraulic pump 252 driven continuously by an electric motor 253 and supplying liquid under pressure continuously to valves 254 and 255 from a reservoir 256. The valves 255 supply and exhaust the hydraulic motors 241, 242, 243, 244, 245 and 246. The valves 254 control the cylinder drives 240 and, in turn, are controlled by opposed solenoids 257 and 258.

When a switch 260 is closed, solenoids 259 are energized to set all the valves 255 in conditions such that the motors 241 to 246 are driven in the forward (upward as viewed in FIG. 4) direction. When the switch 260 is opened, the valves 255 return to conditions in which the motors 241 to 246 drive the line in the opposite direction (downwardly as viewed in FIG. 4).

To control drift, there is provided a feeler lever 270 having at one end rollers 271 engaging opposite sides of the ditch 251. The lever 270 is mounted on and carried by a generally vertical pivot 272 carried by the tractor 221. The lever is positioned between spaced stop 273 and 274 fixed to an actuator 275 of a limit switch 276 carried by the tractor 221. Assuming the travel to be forwardly (upwardly as viewed in FIG. 4) when the tractor 221 drifts to the right to a position near its extreme right-hand position relative to the ditch 251, the feeler lever actuates the switch 276 to close contacts 282 and opens contacts 284, contacts 281 remaining open and contacts 283 remaining closed. Closing of contacts 282 energizes the solenoids 258 to actuate the valves 254 to cause the cylinder drives 240 to contract to turn the wheels 235 somewhat to the left to drive the line somewhat toward the ditch 251. Opening of the contacts 284 stops the motor 253 of the tractor 221, and this helps to swing the line somewhat counter-clockwise, as viewed in FIG. 4, to cause it to move toward the ditch, a continuously driven timer 280 serving to cause drive of the tractor 221 for a fraction of each timer period to inch the tractor 221 forwardly. This continues until the tractor 221 is moved back to its desired path closer to the ditch, at which time the contacts 282 open to deenergize the solenoids 258 to cause the cylinder drives 240 to center themselves to turn the wheels 235 back to straightforward positions. Also the contacts 284 close to again continuously drive the motor 253 of the tractor 221.

If the line 220 drifts to the left (assuming forward travel of the line), the feeler lever 270 closes contacts 281 and opens contacts 283. Closing contacts 281 energizes solenoids 257 to actuate valves 254 to cause cylinder drives 240 to turn the wheels 235 somewhat to the right to cause the tractors to move away from the ditch 251 back to their desired paths, opening of the contacts 283 cutting out the motors of the tractors 222 to 226, which are inched by the timer 280. When the tractor 221 has moved to the right back nearer the center of its path, the contacts 283 reclose and the contacts 281 reopen to resume normal drive.

To maintain alignment, the drives of the tractors 222 to 226 are controlled by flow control valves 291 which are controlled by deflection amplifying sensing wands each secured rigidly to one of each pair of adjacent pipe sections and extending over the universal couplings. If the tractor 222 begins to lead the tractor 223, the flow control valve of the tractor 222 throttles the supply of liquid to the motor 242 of the tractor 222 to slow the tractor somewhat. The other tractors 243 to 246 are similarly controlled.

For rearward or reverse travel, the valves 291 are reversed in their direction of actuation and the valves 255 are reversed when the switch 260 is closed to energize the solenoids 259. Reversing switches 297 and 299 also are reversed in setting to reverse drift control.

Figure 5:
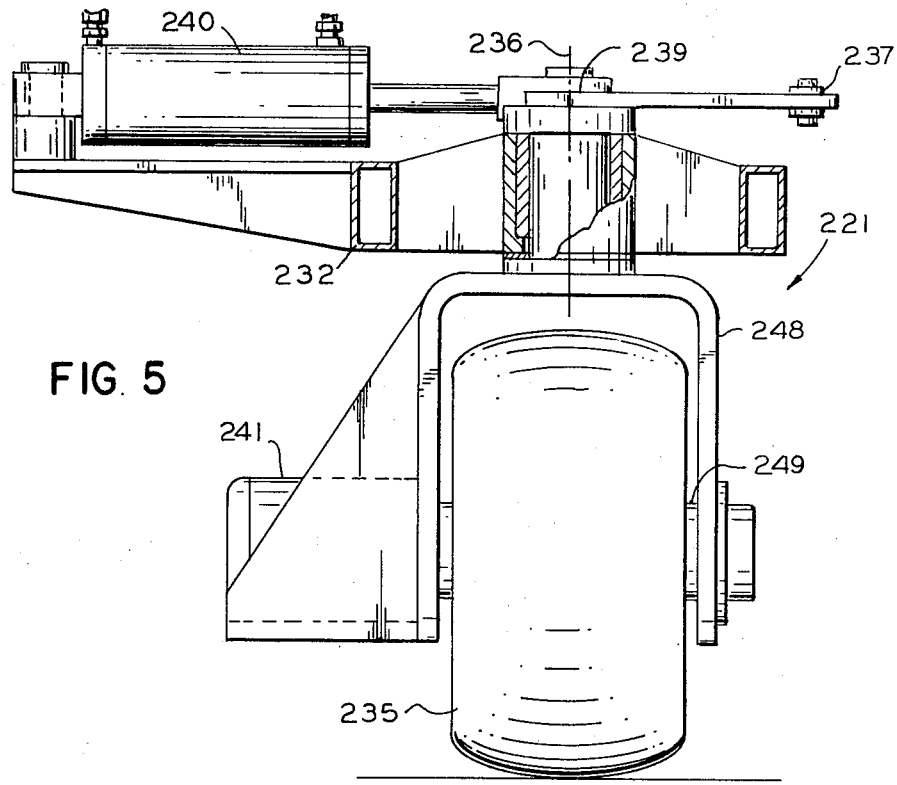
FIG. 5 is an enlarged elevational view of a portion of the line move of FIG. 4.

FIG. 5 shows the pivotal construction of the wheel suspension of the carriage 221, which includes one of the frames 232 with a vertical pivot coupling 248 mounting angular axle 249 on which the wheel 235 is journaled. The axle also carries the hydraulic motor 241. The link 237 is pivotally connected to the outer ends of the axles of the tractor 221. The other tractors are similarly constructed.

The tractors 223 and 225 do not have electric motors 253 and pumps 252 thereon but, rather, are supplied with hydraulic liquid from the pump 252 of the tractor 224, the hydraulic lines to the tractors 223 and 225 extending along the pipe sections 229 and 230 and being carried by these pipe sections. The valves 254 and 255 and solenoids 258 and 259 and cylinder drive 240 for the tractors 223 and 225 are carried by these tractors.

EMBODIMENT OF FIGS. 6–10

A line move 320 forming an alternate embodiment of the invention includes tractors or carriages 321, 322, 323 and 324, the tractor 321 serving to move forwardly (to the right as viewed in FIG. 10) to the righthand end of a baseline in the form of a water-supplying ditch 351 in a field 350, then move rearwardly (to the left as viewed in FIG. 10) to the lefthand end of the ditch. The tractor 321 rigidly carries a sprinkler carrying pipe 325, when moving forwardly, in a position in which the pipe extends to the right of the ditch, as viewed in FIG. 10, then at the righthand end of the ditch, permits the pipe to be moved by the carriages 322, 323 and 324, 180° in a counterclockwise direction, then rigidly holds the pipe in a position extending upwardly from the ditch while, with the carriages 322, 323 and 324, moving the pipe rearwardly to the other end of the ditch, then permitting the carriages 322, 323 and 324 to swing the pipe 180° counterclockwise, and then again, with the carriages 322, 323 and 324, move the pipe forwardly or toward the right along the ditch. Sprinklers 326 (FIG. 6) carried by the pipe 325 at equally spaced points thereon are supplied by the pipe 325 with uniform water pressure during the forward and reverse travel of the line move to irrigate the portions of the field at both sides of the ditch, and when the pipe is being pivoted around the tractor 321 at the ends of the ditch, to supply progressively less water to the sprinklers proceeding inwardly from the outer end of the pipe so that the end areas of the field are uniformly sprinkled.

Figure 6:
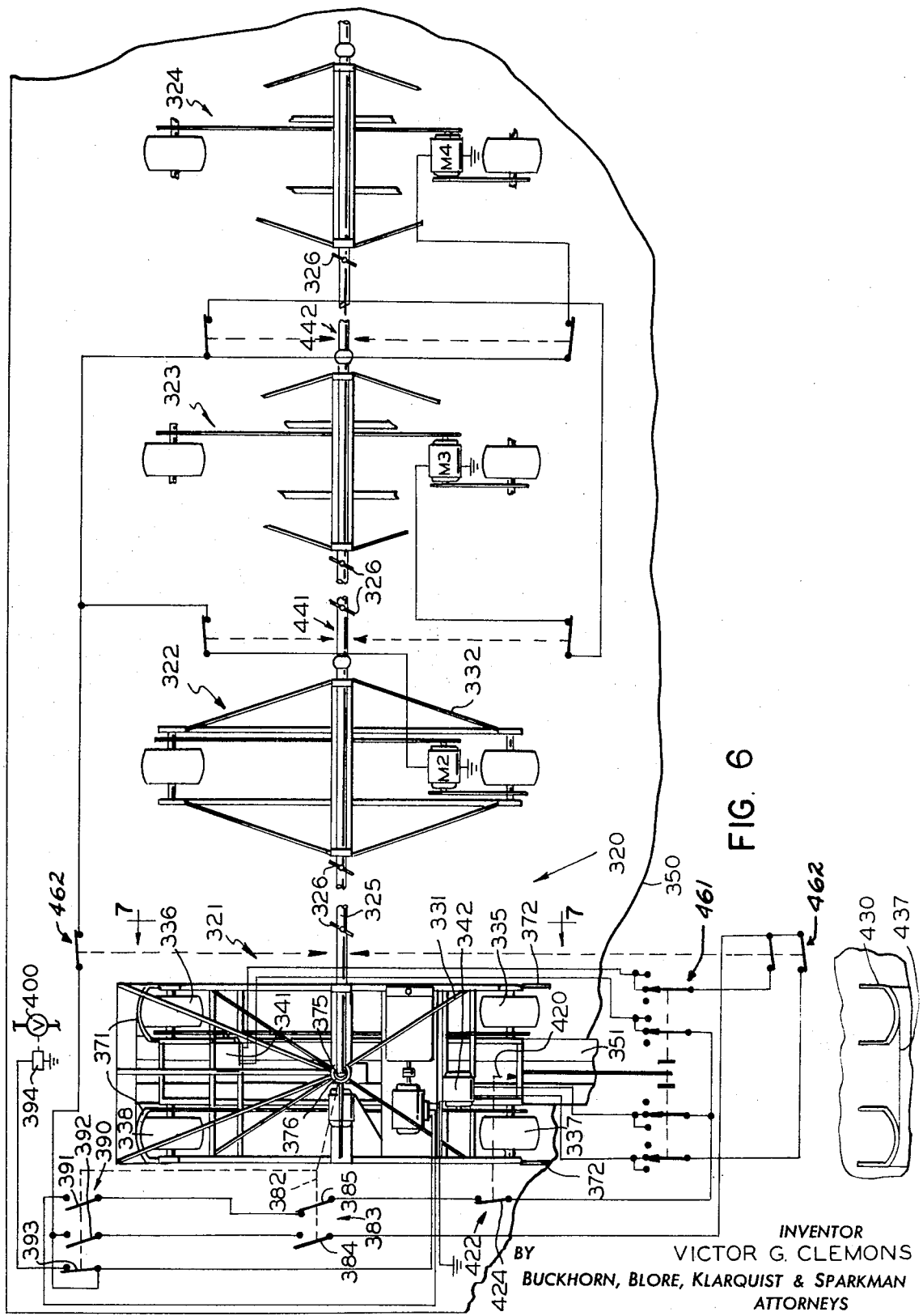
FIG. 6 is a partially schematic, top plan view of a line move forming an alternate embodiment of the invention and a field irrigated thereby.
Figure 7:
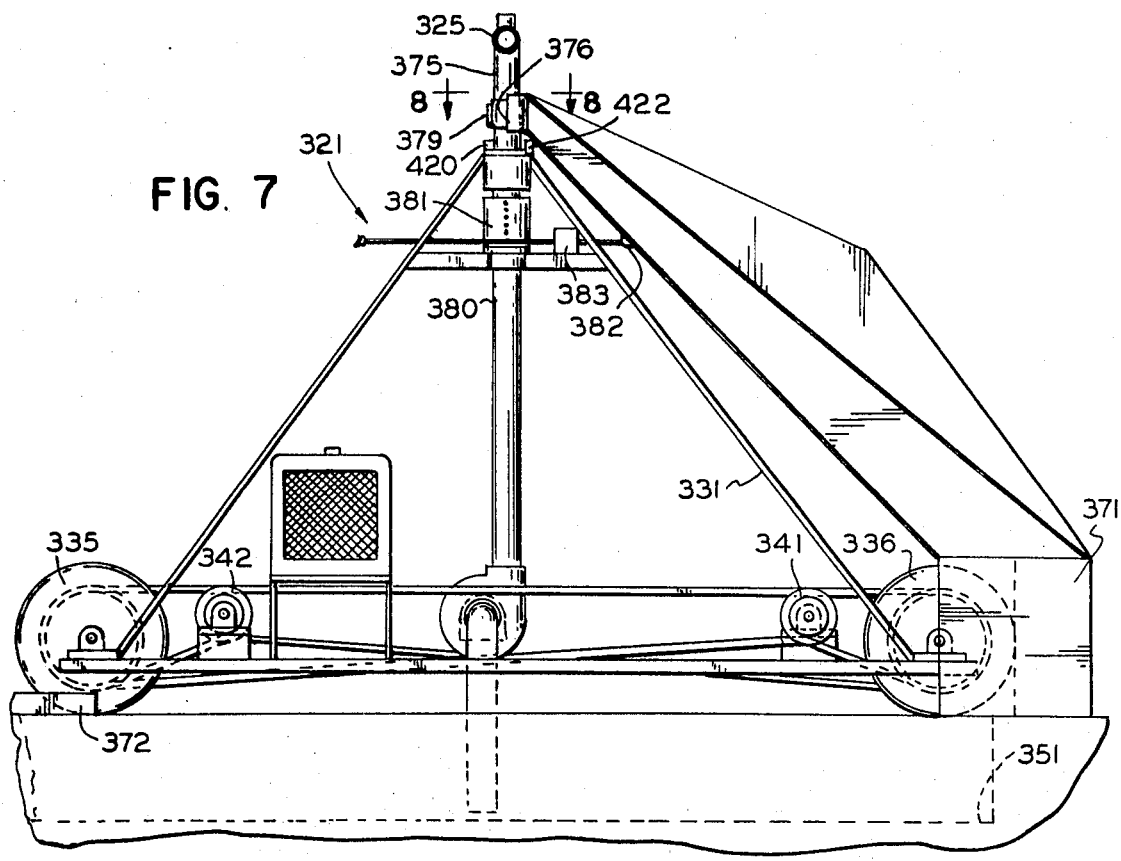
FIG. 7 is an enlarged elevational view taken along line 7—7 of FIG. 6.
Figure 8:
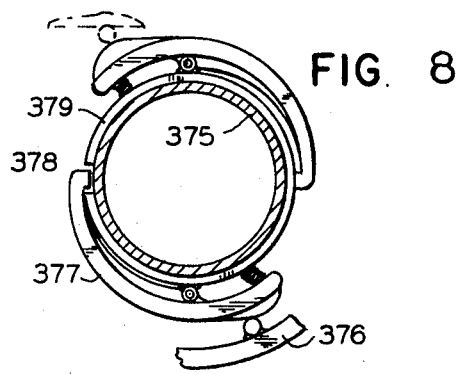
FIG. 8 is an enlarged, fragmentary, horizontal sectional view taken along line 8—8 of FIG. 7.
Figure 9:
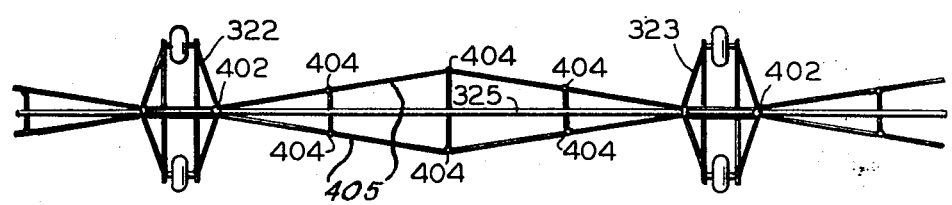
FIG. 9 is an enlarged, fragmentary horizontal plan view of a portion of the line move of FIG. 6.

The tractor 321 is a four-wheeled unit and includes a frame 331 straddling the ditch 351, pairs of wheels 335, 336, 337 and 338 being on opposite sides of the ditch, the wheels 335 and 336 being driven by an electric motor drive 341 on the frame and the wheels 337 and 338 being driven by an electric motor drive 341 on the frame and the wheels 337 and 338 being driven by an electric motor drive 342 on the frame. When the tractor 321 arrives at the upper end of the ditch, as viewed in FIG. 6, the wheels 336 and 337 move into U-shaped stops 371 and the wheels 335 and 338 move between lateral stops 372, a center post pipe 375 of the pipe 325 moving into a releasing-and-reversing, spring-pressed, locking stop 376, which moves a locking dog 377 (FIG. 8) which is carried pivotally on the frame, out of a notch 378 in a collar 379 rigid on the post portion to permit rotation of the pipe about a non-rotatable vertical pipe 380 (FIG. 7) carried by the tractor frame 331 and coupled by a rotary coupling 381 to the pipe 375. An actuator 382 of a reversing limit switch 383 also engages the stop 376 to open contacts 384 (FIG. 6). The contacts 384 of the switch 383 are opened to stop forward drive of the motor drives 341 and 342 and contacts 385 of the switch 383 are closed to set up for the reverse drive of the motor drives 341 and 342. With the pipe 375 unlatched, the tractors 322, 323 and 324 drive the pipe 375, 180° on around the tractor 321, and, just after the start of this turning, the stop 376 actuates the limit switch 383 to open contacts 391 and 392 to prevent drive of the motor drives 341 and 342 during the turning and to close contacts 393 to solenoid 394 which actuate valves 400 to progressively reduce the flow of water to the sprinklers proceeding inwardly from the outer end of the pipe 325 so as to distribute the water uniformly over the semicircular end area being sprinkled. If desired, the more radially inwardly sprinklers on the main pipe may be closed off and by-pass valves 402 (FIG. 9) to truss pipes 405 may be opened to supply water through auxiliary sprinklers 404, which put out water at a lesser rate of flow than the outer sprinklers and thus distribute water uniformly on the semicircular area.

Figure 10:
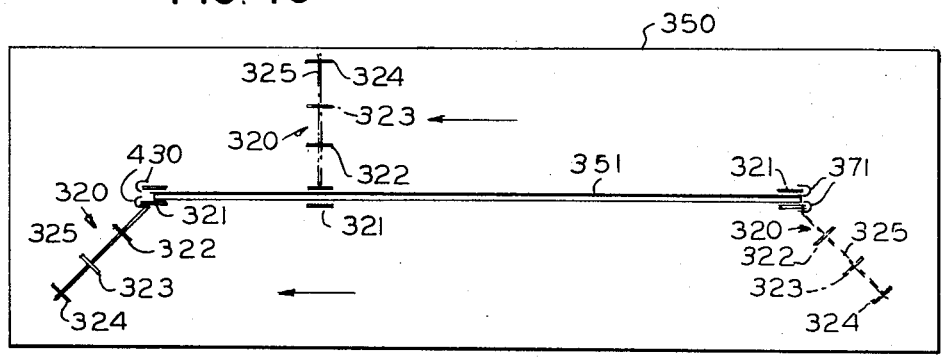
FIG. 10 is a schematic, top plan view of the line move of FIG. 6 and a field irrigated thereby.

When the pipe 325 has been rotated 180° at the right-hand end of the field, as viewed in FIG. 10, and actuator 420 (FIG. 7) on the pipe 325 actuates limit switch 422 to close contacts 424 (FIG. 6) to drive the tractor 321 in reverse, and the line moves back along the other side of the field. When the line reaches a stop 430, the tractor 321 is stopped and the rest of the tractors swing the pipe 180° counterclockwise to water the semicircular portion of the field to the left of the stop 430, as viewed in FIG. 10, the sprinklers being set to provide progressively higher flows proceeding radially outwardly from the tractor 321 to uniformly distribute the water over this semicircular portion of the field. After the 180° turn has been made, the tractor 321 is actuated by limit switch controls to start back to the right as viewed in FIG. 10 to start another cycle, the switch 383 being actuated by stop 437 like the stop 376 to reverse the tractor 321. There are, of course, at the stop 437, stops 432 like the stops 371 and 372 at the other end of the ditch to hold the tractor from from movement during the pivoting of the line around the tractor 321.

Alignment control actuators 441 and 442 control motor drives 443, 444 and 445 of the tractors 322, 323 and 324, respectively, to substantially eliminate misalignment of the tractors 322, 323 and 324, these misalignment controls being similar to those described above of the line move of FIGS. 1 to 3. Drift control switching 461 and alignment control switching 462 are provided.

EMBODIMENT OF FIGS. 11 AND 12

A line move 520 forming an alternate embodiment of the invention includes individually driven tractors or carriages 521, 522, 523 and 524 carrying a pipe 525 having sprinklers 526 and comprising pipe sections 527, 528 and 529. The pipe sections are coupled together by resilient, somewhat stretchable, flexible sleeves 530 for water flow and by strain-assuming ball-and-socket couplings 532 and 533. The tractor 521 is rigidly guided against lateral drift by a base-line or water-supplying ditch 551 (which baseline may, of course, be a stationary pipe or guide wire) and the tractors 521, 522, 523 and 524 are driven individually by electric motor drives 541, 542, 543 and 544, respectively. The tractor carries an engine 546 driving a generator 547 to supply power to the electric motor drives 541 to 544 and a pump motor 548 which drives a pump 549, pumping water from the ditch 551 to the pipe 525.

Figure 11:
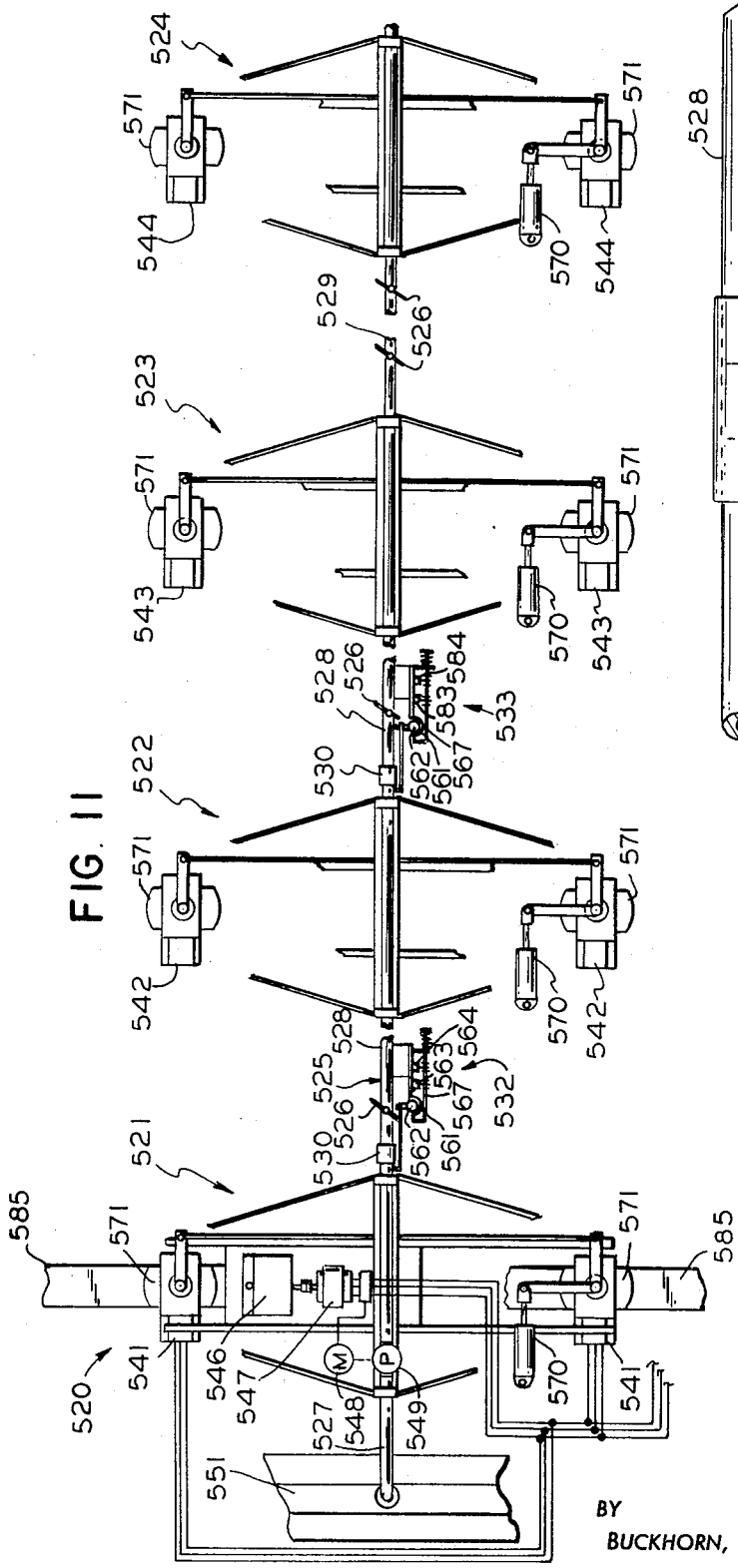
FIG. 11 is a partially schematic top plan view of a line move forming an alternate embodiment of the invention and a field irrigated thereby.
Figure 12:
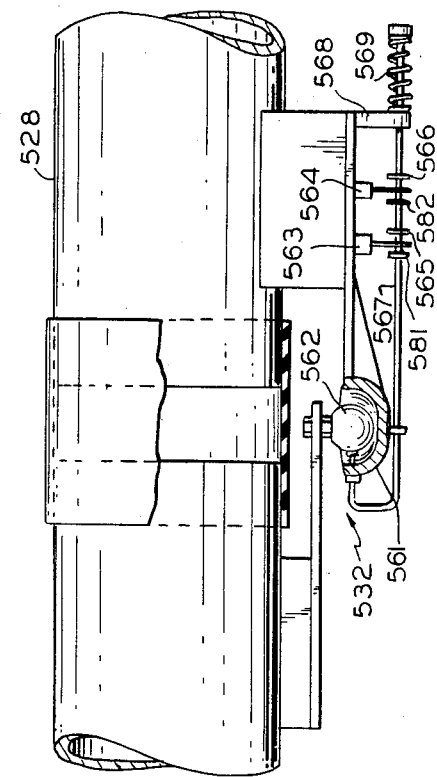
FIG. 12 is an enlarged, fragmentary, top plan view of a portion of the line move of FIG. 11.

If the tractor 522 should drift to the right relative to the tractor 521, the coupling 532 is placed under tension and moves the left side of an elongated socket 561 against the left side of ball 562 and moves limit switches 563 and 564 into actuating engagement with stops 565 and 566 of feeler or actuating rod 567 carried slidably by guide bracket 568 fixed to the pipe section 528 and held in engagement with the ball 562 by compression spring 569. This actuation of the switches 563 and 564 actuates turning mechanisms 570 to turn wheels 571 to the left, assuming the line to be moving upwardly, as viewed in FIG. 11. This, of course, causes the carriage 522 to drive somewhat to the left to remove the tension on the coupling 532 to cause the switches 563 and 564 to actuate the mechanism 570 to turn the wheels 571 to their straight ahead positions. Conversely, if the coupling 532 is placed under substantial compression, which indicates drift to the left of the section 528, the limit switches 563 and 564 are actuated by stops 581 and 582 adjustably positioned on the rod and this actuation of the switches 563 and 564 causes the turning mechanisms 570 to turn the wheels 571 of the carriage 522 to the right to drive the tractor 522 somewhat to the right to remove the excess compression. This releases the switches 563 and 564 and they cause the mechanisms 570 to again set the wheels 571 for straight ahead movement of the carriage. It will be understood that the setting or steering of the wheels 571 of the carriages 523 and 524 are controlled together by turning mechanisms 570 thereof under control by limit switches 583 and 584 carried by the pipe section 529 and actuated by a feeler rod 597 like the rod 567, the feeler rod 597 being reversely actuated by tension and compression of the coupling 533. It will also be understood that alignment controls like those of FIGS. 1 to 3, for example, will be used to control alignment between the pipe sections 527 and 528 and between the pipe sections 528 and 529, a further alignment control responsive to curving of the pipe section 529 serving to control the tractors 523 and 524 being provided to maintain alignment between the tractors 523 and 524.

In the line move 520, a track or guideway 585 serves to guide the tractor 521 exactly parallel to the ditch 551. The track is shown as troughlike. However, it will be understood that the ditch and track could be replaced by a water supply pipe fixed in a position lying on the field (or elevated) and the tractor 521 being provided with guides straddling the pipe on the ground and guiding the tractor 521 along this pipe.

The above-described line moves minimize lateral drift and misalignment so that the tractors make very narrow paths. The line moves 220 and 320 serve to automatically irrigate areas of much greater expanse, almost twice as great, than possible with line moves merely reversible.

I claim:

1. In an irrigation apparatus,
    baseline means extending along a field,
    a line move including a pipe extending generally transversely from the baseline means and a plurality of individually driven tractor means spaced along the pipe and adapted to move the line move along the baseline means in a direction substantially parallel to the baseline means, sensing means responsive to tendency of the line move to drift transversely of the baseline means, and correcting means responsive to the sensing means for controlling the several tractor means to move the several tractor means individually toward or away from the baseline means to correct drift.

2. The irrigation apparatus of claim 1 wherein line move includes a pipe and the tractor means includes a plurality of tractors carrying the pipe and spaced therealong, the tractors including frames, wheels, fork means mounting the wheels and pivotal on the frames to turn the wheels and power means responsive to the sensing means for turning the wheels relative to the frames to drive the tractors toward or away from the baseline means.

3. The irrigation apparatus of claim 1 wherein the baseline means comprises a water ditch.

4. The irrigation apparatus of claim 3 including a flexible water intake extending into the ditch and guided therealong and carried by the tractor means, the sensing means including feeler means carried by the tractor means and engaging the water intake.

5. The irrigation apparatus of claim 1 wherein the tractor means includes a plurality of individually driven tractors spaced along the line move including a first tractor adjacent the baseline means and a second tractor spaced outwardly along the line move from the baseline means and the first tractor, the first and second tractors normally being driven at the same speed, the correcting means including first means for slowing the first tractor relative to the second tractor when the line move tends to drift away from the baseline means to swing the line move somewhat toward the baseline means, the correcting means also including second means for slowing the second tractor relative to the first tractor when the line move tends to drift toward the baseline means to swing the line move somewhat away from the baseline means.

6. The irrigation apparatus of claim 5 wherein the first means serves to stop and inch the first tractor.

7. The irrigation apparatus of claim 5 wherein the first means includes a timer intermittently actuating the drive of the first tractor.

8. The irrigation apparatus of claim 1 wherein the line move includes a plurality of pipe sections and coupling means connecting the pipe sections together and permitting limited longitudinal movement between the pipe sections, the sensing means including a plurality of means movable with the sections to detect when the coupling means is placed under tension and also detect when the coupling means is placed under compression.

9. The irrigation apparatus of claim 8 wherein the coupling means includes a ball secured to one of the pipe sections, an elongated, generally ellipsordal socket secured to a second one of the pipe sections and an elastic sleeve coupling the last mentioned pipe sections, the sensing means including a feeler engaging the ball and switch means operable by the feeler carried by the second one of the pipe sections.

10. The irrigation apparatus of claim 1 wherein the line move includes a first tractor closest to the baseline means, a second tractor farther from the baseline means than the first tractor, other tractor means spaced farther the baseline means than the second tractor, individual drives for the first tractor, the second tractor and the tractor means, and a pipe carried by the tractors and the tractor means, the sensing means and the correcting means including means for slowing the travel of the first tractor relative to that of the second tractor to swing the second tractor somewhat toward the baseline to correct drift away from the baseline, the sensing means and the correcting means also including means for slowing the travel of the second tractor relative to that of the first tractor to swing the tractor somewhat away from the baseline to correct drift toward the baseline.

11. The irrigation apparatus of claim 10 including alignment control means serving to control the relative speeds of travel of the second tractor and the tractor means.

12. In an irrigation apparatus, baseline means extending along the central portion of a field, a line move including a pipe, tractor means carrying the line move and including at least one outer tractor spaced substantially from the baseline means and a reversible inner tractor movable along the baseline means and carrying the pipe pivotally thereon, and control means for directing the tractor means in one direction along one side of the field, around one end portion of the field and back along the other side of the field, the control means including means stopping the inner tractor at one end of the baseline means and continuing to drive the outer tractor to pivot the pipe 180° about the inner tractor, and means for driving the inner tractor back along the baseline means when the pipe has been so pivoted 180° and continuing to drive the outer tractor.

13. The irrigation apparatus of claim 12 wherein the inner tractor straddles the baseline means.

14. The irrigation apparatus of claim 13 including a stop at said end of the baseline means for positively stopping the inner tractor.

15. The irrigation apparatus of claim 14 including latching means on the inner tractor for latching the pipe to the inner tractor to prevent pivoting of the pipe relative to the inner tractor, and means operable by the stop for releasing the latch means when the inner tractor reaches said end of the baseline means.

16. The irrigation apparatus of claim 12 including water supply means for controlling flows to the sprinklers to supply substantially uniform coverage while the line is moved along said sides of the field and for creating progressively less flows to the sprinklers proceeding along the pipe toward the baseline means when the line is moved around said one end portion of the field to supply substantially uniform coverage to said one end portion of the field.

17. The irrigation apparatus of claim 16 wherein the water supply means includes a plurality of auxiliary sprinklers, and trusswork piping serving to truss the pipe and to supply water to the auxiliary sprinklers when the line is moved around said end portion of the field.

18. In an irrigation apparatus,
a tractor frame,
a sprinkler pipe mounted on the frame,
wheel means,
fork means carried by the wheel means,
means mounting the fork means pivotally on the frame,
motor drive means mounted on the fork means in line with the wheel means and coupled to the wheel means for driving the wheel means,
reversible power means for turning the fork means relative to the frame,
baseline means,
and remote control sensing means responsive to drift of the frame relative to the baseline means for actuating the power means in a direction tending to correct such drift.

19. The irrigation apparatus of claim 18 wherein the wheel means comprises a pair of wheels, the fork means comprises a pair of forks and including a link coupling the forks.

20. The irrigation apparatus of claim 18 wherein the reversible power means comprises a fluid pressure cylinder drive mounted on the frame.

* * * * *